C. E. REITZ.
ROOT PULLER.
APPLICATION FILED JULY 13, 1920.
1,364,807.
Patented Jan. 4, 1921.
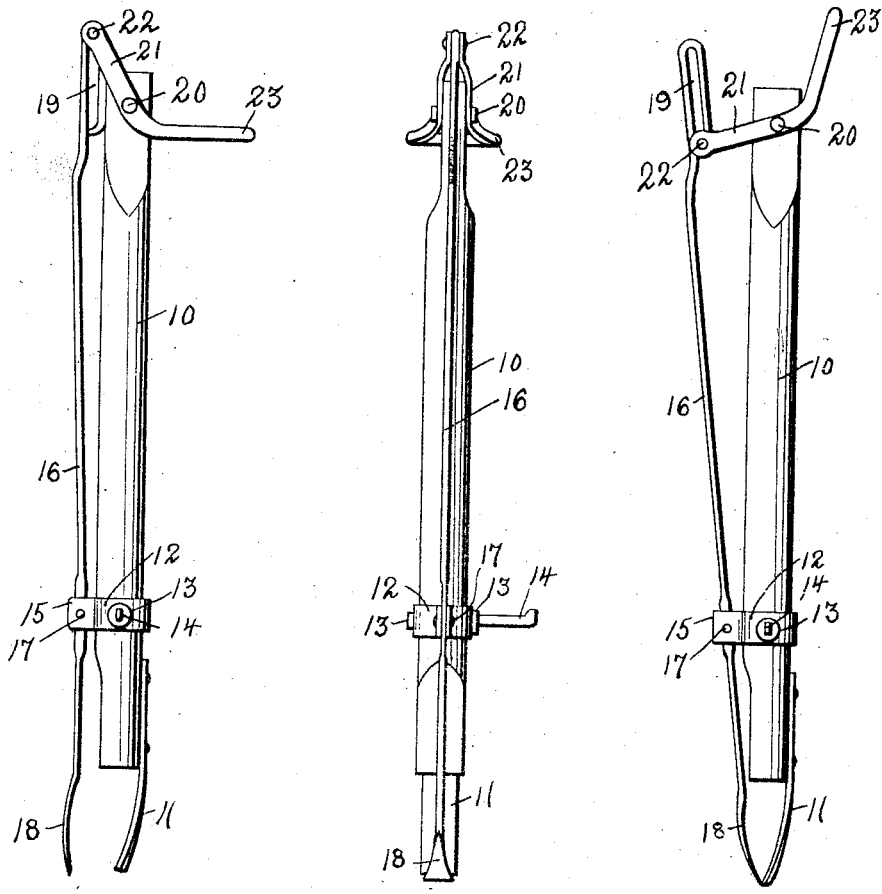
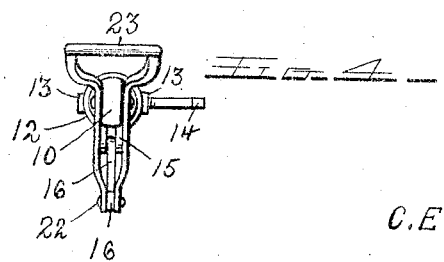
Inventor
C. E. Reitz
By Geo. F. Kimmel
Attorney

UNITED STATES PATENT OFFICE.

CHARLES E. REITZ, OF REITZ, PENNSYLVANIA.

ROOT-PULLER.

1,364,807.  Specification of Letters Patent.  Patented Jan. 4, 1921.

Application filed July 13, 1920. Serial No. 395,839.

*To all whom it may concern:*

Be it known that I, CHARLES E. REITZ, a citizen of the United States, residing at Reitz, in the county of Somerset and State of Pennsylvania, have invented certain new and useful Improvements in Root-Pullers, of which the following is a specification.

This invention relates to implements for removing noxious weeds from gardens, lawns and the like, and has for one of its objects to simplify and improve the construction and increase the efficiency and utility of devices of this character.

With these and other objects in view, the invention consists in certain novel features of construction as hereinafter shown and described and then specifically pointed out in the claims, and in the drawings illustrative of the preferred embodiments of the invention.

Figure 1 is a side elevation of the improved implement in open or inoperative position, Fig. 2 is a front elevation with the parts arranged as shown in Fig. 1.

Fig. 3 is a view similar to Fig. 1 with the parts shown in closed or operative position, Fig. 4 is a plan view with the parts arranged as in Fig. 3.

The improved implement includes a stock or body 10 of wood or metal, and having a stationary root engaging and holding element 11 riveted or otherwise attached to the stock and extending below the same.

The member 11 is longitudinally curved inwardly at the lower free end and likewise curved transversely as shown.

Surrounding the stock 10 above the member 11 is a divided sleeve or collar 12, and extending through the collar and likewise through the stock 10 is a bolt or pin 13 extended at one end as shown at 14 to form a foot rest to enable the operator to apply the power of one foot to force the member 11 into the ground.

The laterally directed ends 15 of the collar 12 constitute ears between which a rod 16 is pivoted at 17. At its lower end the member 16 is widened into a curved jaw 18 opposed to the lower curved portion of the member 11.

At its upper end the rod 16 is longitudinally slotted as shown at 19, and pivoted at 20 to the upper end of the stock 10 is a two part lever 21, the latter bearing at one end upon opposite sides of the rod and connected by a pin 22 extending through the slot 19. At the other end the lever is bent into a hand grip 23. By this arrangement it will be obvious that when the hand grip portion 23 of the lever 21 is moved downwardly as shown in Fig. 1, the jaw portions 11 and 18 will be separated, as shown in Fig. 1, to enable the implement to be forced into the ground upon opposite sides of a root or plant, and then by moving the hand grip upwardly the jaw 18 will be moved forcibly toward the jaw portion 11, and thus firmly grip the root or other object and enable it to be withdrawn from the ground.

The stock 10 will generally be of wood and remaining portions of metal, but the stock may also be of metal, if preferred.

The device is simple in construction and by its use noxious growths of various kinds, such as burdock, dandelion, thistles, wire grass, and the like may be destroyed by extracting the roots of the plants bodily from the soil.

The implement may be constructed of any required size to adapt it to plants of various sizes.

The preferred embodiment of the invention is disclosed in the drawings and set forth in the specification, but it will be understood that any modifications within the scope of the claims may be made in the construction without departing from the principle of the invention or sacrificing any of its advantages.

What I claim is:

1. An implement of the class described comprising a stock, a stationary holding element attached to the stock and extending below the same, a movable holding element coacting with the stationary holding element and swinging upon the stock and having a longitudinally directed slot at its upper end, and a lever arm swinging upon the stock and having a pin engaging in said slot.

2. An implement of the class described comprising a stock, a stationary holding element attached to the stock and extending below the same, a sleeve encompassing the stock, a pin extending through the sleeve and stock and extended into a foot rest, a movable holding element coacting with the stationary holding element and mounted to swing upon the sleeve, and a lever arm swinging upon the stock and operatively coupled to the movable holding element.

In testimony whereof, I affix my signature hereto.

CHARLES E. REITZ.